April 15, 1930.  W. R. LINDEN  1,754,721

METHOD OF WELDING

Filed March 9, 1926

INVENTOR:
Walter R. Linden,
BY
Byrne Townsend & Brickenstein,
ATTORNEYS.

Patented Apr. 15, 1930

1,754,721

UNITED STATES PATENT OFFICE

WALTER R. LINDEN, OF PALISADES PARK, NEW JERSEY, ASSIGNOR TO THE LINDE AIR PRODUCTS COMPANY, A CORPORATION OF OHIO

METHOD OF WELDING

Application filed March 9, 1926. Serial No. 93,518.

This invention relates to welded joints and more specifically to a method of preventing distortion in plates and sheets butt welded by the use of high temperature heating means, such as an oxy-acetylene flame or an electric arc.

Heretofore, when plates, sheets, and other structural members have been joined at their edges by fusion welding, the expansion and contraction caused by the heating and cooling of edge portions of the sheets and the fusion-deposited metal has caused the united members to warp, buckle, or become otherwise distorted to such an extent that the strength of the joint as well as the appearance of the finished structure are impaired. Furthermore, the distortion of the united members during the welding operation has been a hindrance to the welder in performing the operation quickly and economically.

In order to compensate for the tendency of the cooling weld, during its progress, to draw the opposed edges of the united members closer together, the welder usually separated the edges of the members at the end of the joint to be welded last a distance equal to from 2% to 6% of the length of the joint. Instead of eliminating the distortion this merely reduces it to a point where the members can be joined without their edges overlapping and thereby causing excessive delay. In welding such joints, the members are firmly butt-welded during the first part of the welding operation while their unjoined edges are separated at an angle and at the last part of the welding operation while their edges are practically together. The stresses and distortions caused in the united members, by drawing their separated edges together at one point while they are firmly united at another, still remains to weaken the joint and spoil its appearance.

The chief object of this invention is to prevent the stresses and resultant distortion which are ordinarily set up in a welded joint of this character. Other objects are to produce a joint which is stronger in construction and neater in appearance.

Broadly speaking, the metal sheets to be butt welded are prepared by cutting blind slots angularly and at intervals into the edges to be united. These slots are desirably rather narrow and much longer than their width; their dimensions and distance apart being more exactly determined by the speed of welding and the length of seam to be welded. The slots form a series of spaced flexible tongues along the edges of the sheets. To proceed with the welding, the sheets are placed edge to edge with the open ends of the slots in one edge opposite the central portions of the tongues along the other edge. The main weld between the sheets is then formed in steps from one slot to the next by fusion depositing weld metal between the opposed edges, during which time heating and cooling stresses in the sheets and weld metal are compensated for by the slots. Each step in the main welding operation is carried to the open end of a slot whereupon that slot is closed by fusion depositing weld metal therein, beginning at the blind end of such slot. The plates are thus united by a compound weld which has portions extending into each of the plates.

The objects and novel features of my invention will be apparent from the following description taken with the drawings, in which.

Figure 1:
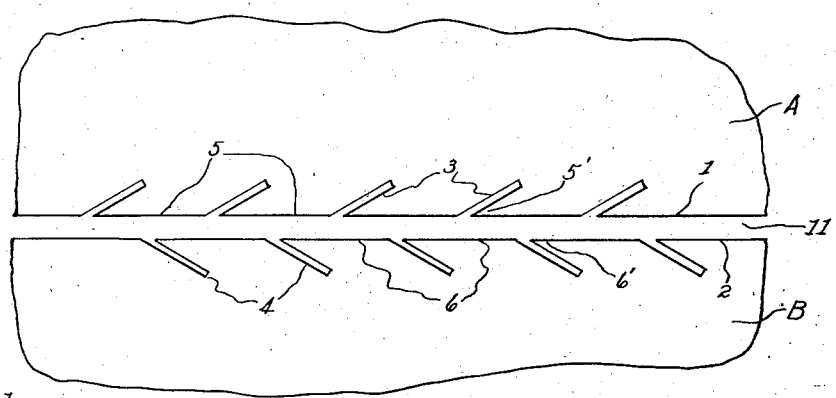
Fig. 1 is a view of metal sheets prepared to be welded according to this invention.

Referring to the illustrations, A and B represent sections of metal plates to be butt-welded along their edges 1 and 2. A series of stress-relieving notches or slots 3 are cut into the edge of plate A, and similar blind slots 4 are cut angularly into the edge of plate B. A series of relatively flexible tongues or teeth 5 are formed in the edge of plate A between the slots 3 and, likewise, similar tongues or teeth 6 are formed in the edge of plate B. The slots 3 and 4 should preferably be cut at an angle to the edges 1 and 2 of the plates A and B so they incline toward the starting end 11 of the weld between the plates A and B. The forward ends of the tongues thus present acute-angled portions 5', 6' which are more yieldable than if the slots were cut perpendicularly into the edge of the plate. The distances between the open ends of the successive slots 3 and 4 in the plates A and B should preferably be approximately the same, so when the plates are set edge to edge for welding the open ends of the slots in the edge of one plate may be positioned opposite the tongues of the opposed plate, desirably approximately centrally between the slots in the edge of the other plate. The slotted edges are set in the edge to edge relation, either abutting throughout their length or slightly separated at one end.

Figure 2:
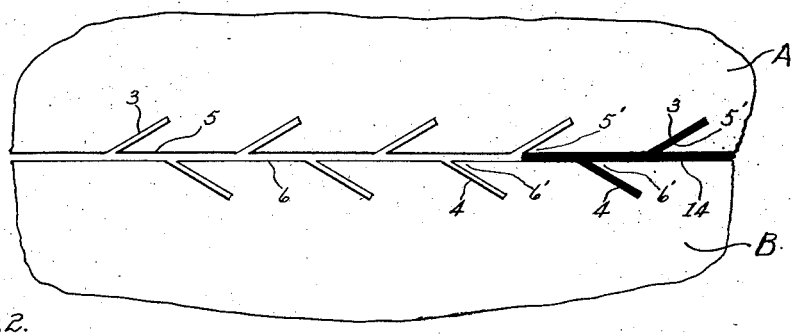
Fig. 2 is a view of the sheets partially welded together.
Figure 3:
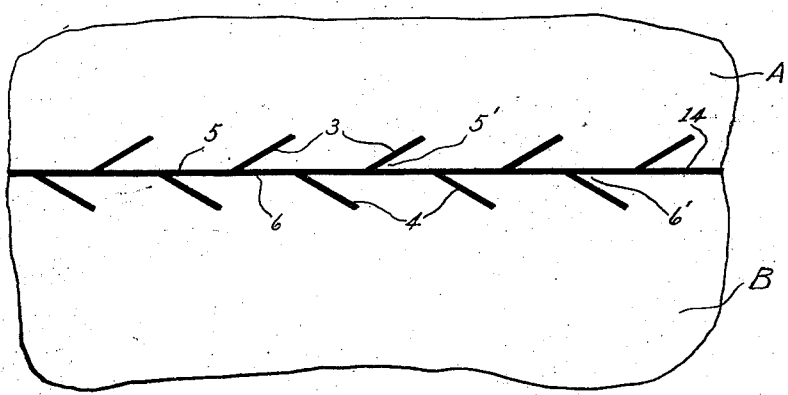
Fig. 3 is a view showing the sheets and the completed weld uniting them.

After the edges of the plates have been properly beveled, slotted, and abutted or opposed as described, the operation of welding should preferably begin at the end 11 of their junction toward which the slots 3 and 4 incline. The source of the welding heat may be either an electric arc or high-temperature gas flame, but I prefer the oxy-acetylene blowpipe as less heat is radiated to the portion of the plates adjacent the weld. Beginning at the point 11, the weld metal should first be applied along the junction line as shown at 14, Fig. 2, until the opposed edges are united up to the open end of the first slot.

Then the first slot 3 in the plate A is closed by fusion depositing weld metal therein, beginning at the rear or blind end of the slot and working toward its open end. Thereupon, weld metal is again deposited along the junction line 14, from the open end of the first slot 3 to the open end of the first slot 4 in the plate B, after which the first slot 4 is closed by depositing weld metal therein beginning at its rear end and working toward its open end. The welding is then continued along the junction 14 to the open end of the second slot 3 in the plate A, and so on, successively closing alternate slots as they are reached in welding step by step along the main line of weld.

As the metal forwardly of the torch is heated, it expands. The slots prevent such expansion from distorting the metal. As the portion of the deposited metal just behind the torch cools, it tends to draw the edges of the plates together. This contraction which usually sets up the most serious strains, does not distort the plates as heretofore, because the flexibility of the teeth 5 and 6, particularly their acute-angled portions 5', 6', permits them to yield sufficiently in response to the contractive force of the cooling weld metal to compensate for the stresses which would otherwise be transmitted into the plates and cause objectionable distortion.

In some instances, the welding procedure may be somewhat varied from the preferred order just described. For example, the main junction weld between the plates may first be entirely completed, the slotted edges compensating to a large extent for heating and cooling stresses. Afterwards, the slots 3 and 4 may be closed by depositing fused weld metal therein, thereby completing the joint.

While the hereindescribed joint and method of welding it are particularly applicable to metal plates and sheets, especially those of large dimensions, it is to be understood that the invention may also be used in joining members of various sizes, shapes and compositions.

I claim:

1. A method of butt-welding metal sheets that comprises cutting slots at intervals into the sheet edges to be united; disposing such slotted edges in opposed relation with the open ends of the slots in one sheet opposite the tongues formed between the open ends of the slots in the other sheet; and depositing weld metal along such opposed edges and in said slots.

2. A method of butt-welding metal sheets according to claim 1, wherein said slots are inclined to said edges, and weld metal is deposited in said slots beginning at the rear or closed ends thereof.

3. A method of uniting metal edges by welding that comprises cutting slots at intervals into the edges to be united; placing such slotted edges contiguous to one another; depositing weld metal along said contiguous edges; and closing the slots with weld metal as such slots are reached in the progress of the welding operation along said edges.

4. A method of uniting metal edges by welding that comprises cutting slots at intervals into said edges; disposing such edges in opposed relation, with the open ends of the slots in one edge opposite tongues formed between the open ends of the slots in the other edge; depositing weld metal along said edges in steps from one slot to the next; and successively closing said slots with weld metal as they are reached in the progress of the welding operation along said edges.

5. A method of uniting metal sheets and plates by welding that comprises cutting inclined slots at intervals in the sheet edges to be united; placing such slotted edges in edge-to-edge opposed relation with their slots inclined toward the starting end of the weld and with the open ends of the slots in one edge between those in the other; fusion depositing weld metal along said edges, in steps from one slot to the next; and, as each slot is reached, closing the same by depositing weld metal therealong, beginning at the closed or rear end of the slot.

6. A composite article composed of body members having a compound weld uniting the same, the metal of said weld having obliquely disposed branching portions extending into said members.

7. A composite article composed of members having a compound weld uniting the same, the body of said weld having obliquely disposed branching portions extending into said members, said branching portions being formed by depositing metal in slots as the body of the weld is formed for distributing the stresses resulting from the welding.

8. The method of uniting metal parts by fusion-depositing weld metal therebetween which comprises forming slots therein that are open at the edges of the parts, placing such slotted edges contiguous to one another, depositing said weld metal at one end of such contiguity, progressing therealong and alternately depositing the metal along such contiguity and in the slots as the same are reached progressively.

9. A composite structure having metal parts and a compound weld uniting said parts, said weld comprising a main portion parallel to contiguous edges of said parts and branching portions extending laterally from said main portion and alternately into said parts.

10. A composite structure having metal parts and a compound weld uniting said parts, said weld comprising a main portion parallel to contigous edges of said parts and inclined portions branching laterally from said main portion and alternately into said parts.

11. In the process of butt welding parts by fusion-depositing weld metal along the contiguous edges of the parts the method of preventing distortion of said parts which comprises forming strain relieving slots which extend obliquely into said parts from the edges thereof.

12. The method of uniting metal parts solely by fusion deposited weld metal that comprises forming slots therein which are open at the edges of said parts, placing such slotted edges contiguous to one another and then starting at one end of the contiguously disposed edges and progressively depositing weld metal along such contiguous edges toward the other end, said slots being filled as they are reached in the progressive welding of the contiguous edges.

In testimony whereof, I affix my signature.

WALTER R. LINDEN.